United States Patent
Bauman

(10) Patent No.: US 10,502,272 B2
(45) Date of Patent: Dec. 10, 2019

(54) ONE WAY CLUTCH CAGE WITH INTEGRATED RETURN SPRING

(71) Applicant: Schaeffler Technologies AG & Co. KG, Herzogenaurach (DE)

(72) Inventor: Jeremiah Bauman, Orrville, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 184 days.

(21) Appl. No.: 15/679,365

(22) Filed: Aug. 17, 2017

(65) Prior Publication Data
US 2019/0055998 A1  Feb. 21, 2019

(51) Int. Cl.
*F16D 41/067* (2006.01)
*F16D 41/06* (2006.01)

(52) U.S. Cl.
CPC .... *F16D 41/067* (2013.01); *F16D 2041/0605* (2013.01); *F16D 2250/0023* (2013.01)

(58) Field of Classification Search
CPC ............... F16D 2041/0605; F16D 41/067
USPC ................ 192/45.006, 45.007, 45.012
See application file for complete search history.

(56) References Cited

U.S. PATENT DOCUMENTS

| | | | |
|---|---|---|---|
| 3,087,588 A | | 4/1963 | Fischer |
| 3,972,573 A | * | 8/1976 | Marola .............. F16D 41/067 384/579 |
| 3,994,377 A | * | 11/1976 | Elmore .............. F16D 41/067 192/45.007 |
| 4,901,833 A | * | 2/1990 | Lederman ........... F16D 41/067 188/82.84 |
| 4,953,353 A | | 9/1990 | Lederman |
| 6,488,135 B1 | * | 12/2002 | Kinoshita .......... F16D 41/067 192/110 B |
| 9,145,927 B2 | | 9/2015 | Luipold et al. |

* cited by examiner

*Primary Examiner* — Mark A Manley
(74) *Attorney, Agent, or Firm* — Volpe and Koenig, P.C.

(57) ABSTRACT

A one way clutch with an integrated spring is disclosed. The assembly includes an inner ring and an outer ring, one of which has a ramped portion. A cage defines a plurality of rolling element pockets, and includes first and second sidewalls each having an integrated tab. Rolling elements are biased by the integrated tabs toward both the inner and outer rings. The force angle of the integrated tabs is calibrated for a predetermined application.

16 Claims, 5 Drawing Sheets

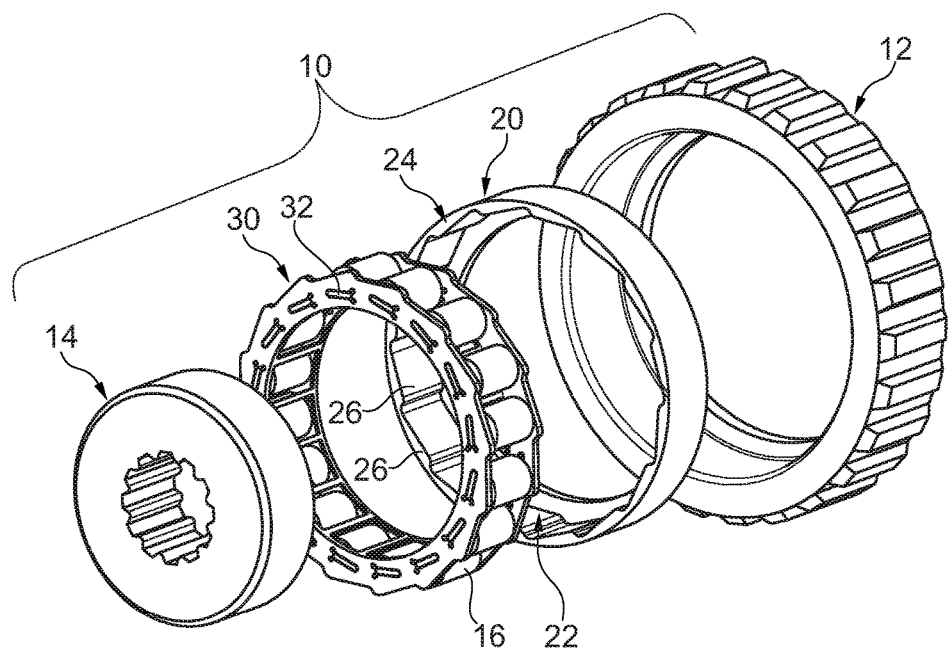
Fig. 1
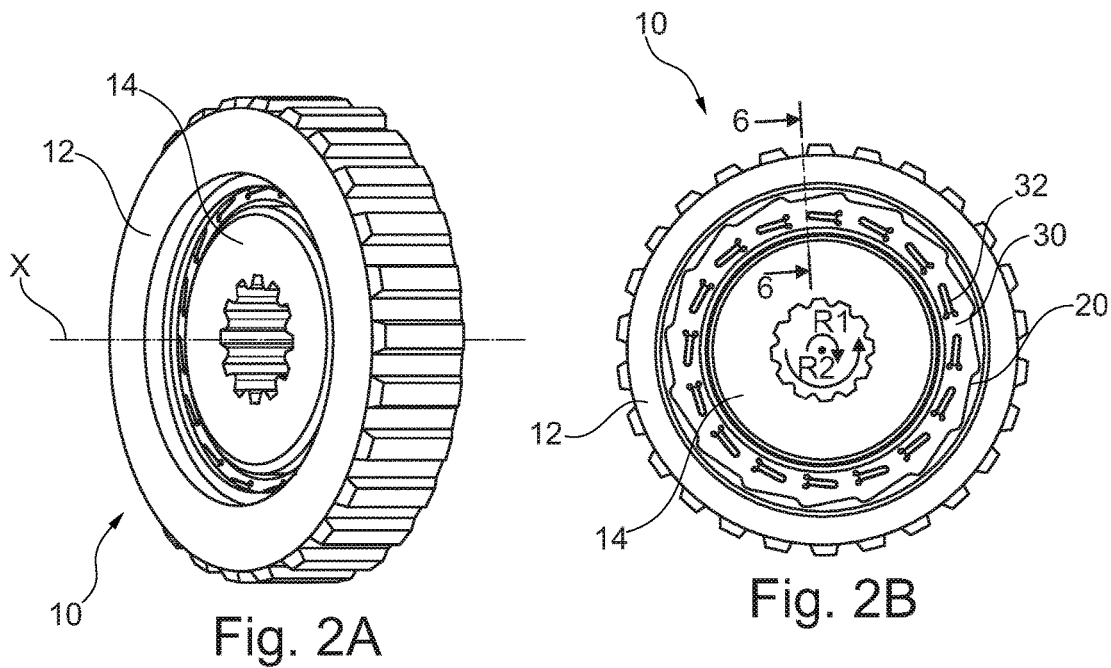
Fig. 2A
Fig. 2B

ONE WAY CLUTCH CAGE WITH INTEGRATED RETURN SPRING

FIELD OF INVENTION

The present invention relates to a one way clutch assembly and is more particularly related to a return spring integrated into a cage that holds rolling elements for a one way clutch assembly.

BACKGROUND

One way clutch assemblies are used in a wide variety of applications. One type of clutch assembly is a one way clutch assembly that includes rolling elements that are engaged by corresponding ramped portions of an inner or outer housing. This configuration allows a first component of the assembly to freely rotate with respect to a second component of the assembly in a first rotational direction. In a second, opposite rotational direction, the rolling elements lock up and the first component transmits torque to the second component.

A cage or other type of retention element is typically required to keep the rolling elements in position and aligned with the corresponding ramped portions during operation. Moreover, a spring, e.g., an accordion spring, is mounted to the cage to bias rolling elements into an ideal operational position that engages both inner and outer rings to prevent lash in the assembly during use. Different configurations for retaining rolling elements in clutch assembles are disclosed, for example in U.S. Pat. Nos. 4,953,353 and 9,145,927. These solutions require additional space and/or additional components, e.g., a spring, spring mounting structure, and space for the spring to expand. This in turn limits the number of rolling elements that can be positioned around the assembly, which limits the torque capacity of the one way clutch assembly. Finally, these solutions also experience lift off, i.e., zero drag, of rolling elements due to centrifugal forces.

It would be desirable to provide a simple, cost effective way to bias rolling elements within a cage of a one-way clutch assembly.

SUMMARY

A one way clutch assembly is provided. The assembly includes an inner ring, an outer ring, a ramp, and a cage. The ramp is formed in one of the inner ring or the outer ring facing the other of the inner ring or the outer ring. The cage defines at least one rolling element pocket and includes a substantially planar first sidewall, a first tab extending in or parallel to a plane of the first sidewall, and rolling elements located in the pockets. The rolling elements are biased by the tab toward at least one of the inner ring or the outer ring.

In another aspect, a circular cage for a one way clutch is provided. The cage includes a plurality of pockets each adapted to receive a rolling element. The plurality of pockets each include a first resilient tab integrally formed with the cage and extending generally circumferentially along a portion of the cage. The tab is adapted to bias a rolling element in a respective pocket in a radial direction of the cage.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 1 is an exploded perspective view of a one way clutch assembly according to a first embodiment of the invention;

FIG. 2A is a perspective view of the one way clutch assembly of FIG. 1;

FIG. 2B is a side elevational view of the one way clutch assembly of FIG. 1;

DETAILED DESCRIPTION OF THE PREFERRED EMBODIMENTS

Figure 3A:
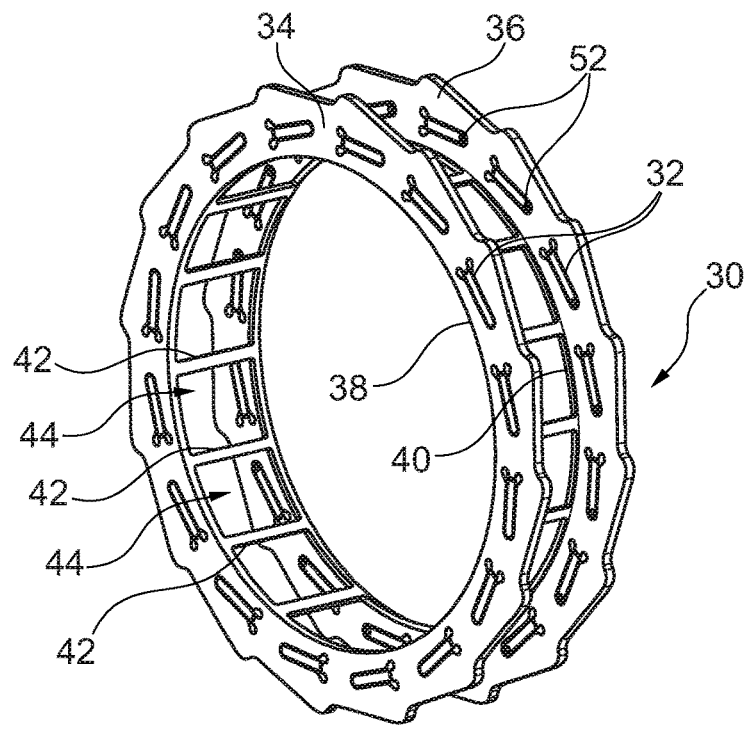
FIG. 3A is a perspective view of a cage of the one way clutch assembly of FIG. 1.

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Certain terminology is used in the following description for convenience only and is not limiting. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

The present disclosure relates to a one way clutch assembly for a variety of applications, particularly to an integrated spring arrangement for biasing rolling elements. The cage defines rolling element pockets and has two sidewalls. Each sidewall has an integrated tab that acts as a spring, significantly reducing space and simplifying manufacture. An angle orienting the integrated tab relative to the rolling element may be calibrated for predetermined metrics.

FIGS. 1-2B show an embodiment of a one way clutch assembly 10 including a housing 12, inner ring 14, an outer ring 20, a cage 30, and an axis X defined at the center of all of these parts. A plurality of rolling elements 16 are located within the cage 30.

The outer ring 20 includes an opening 22 and a first ramped portion 24. As shown in FIG. 1, the first ramped portion 24 of the housing 20 preferably includes a plurality of ramps 26.

During operation, the first ramped portion 24 of the outer ring 20 is configured to allow the inner ring 14, which is typically mounted on a shaft or is itself a shaft, to rotate freely about the rotational axis X in a first relative rotational direction R1 (illustrated in FIG. 2B) with respect to the housing 20. In an opposite, second relative rotational direction R2 (shown in FIG. 2B), the rolling elements 16 lock up by moving radially inwardly along the ramps 26, thereby allowing torque to be transmitted between the inner ring 14 and the housing 20.

Turning to FIGS. 3A-5, the cage 30 includes a first sidewall 34 and a second sidewall 36 each defining an inner rim 38, 40, respectively. A plurality of webs 42 extend between the first and second sidewalls 34, 36. A plurality of tabs 32 are formed in at least one of the sidewalls 34, 36 as one unitary part, and preferably the tabs are integrally formed with both of the sidewalls 34, 36. Likewise the webs 42 are affixed to the sidewalls 34, 36 resulting in one unitary part, and preferably the webs are integrally formed with the sidewalls 34, 36.

A plurality of pockets 44 are defined in the cage 30 between sequential webs 42 and between the sidewalls 34, 36. As such, each pocket 44 includes two of the tabs 32. Each pocket 44 serves to support a single rolling element 16 engaged by both tabs 32.

Figure 4A:
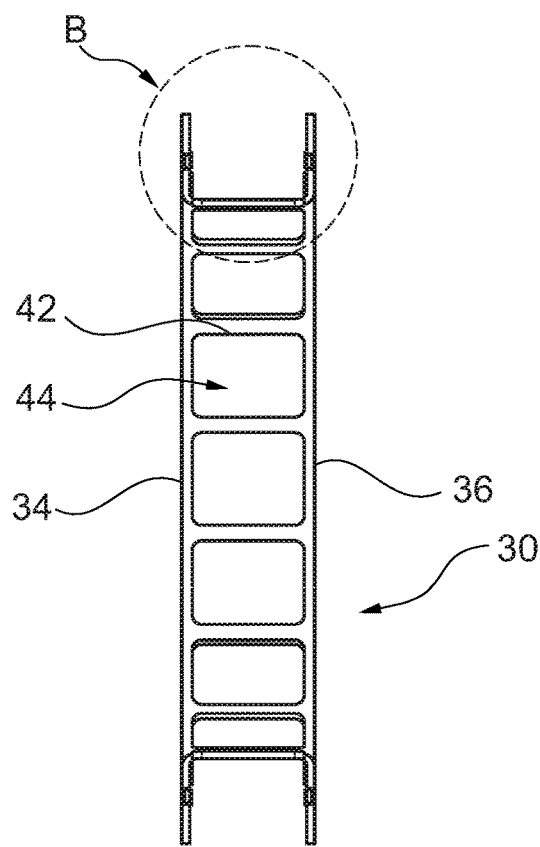
FIG. 4A is a cross sectional view of the cage of FIG. 3B taken along line 4-4.
Figure 4B:
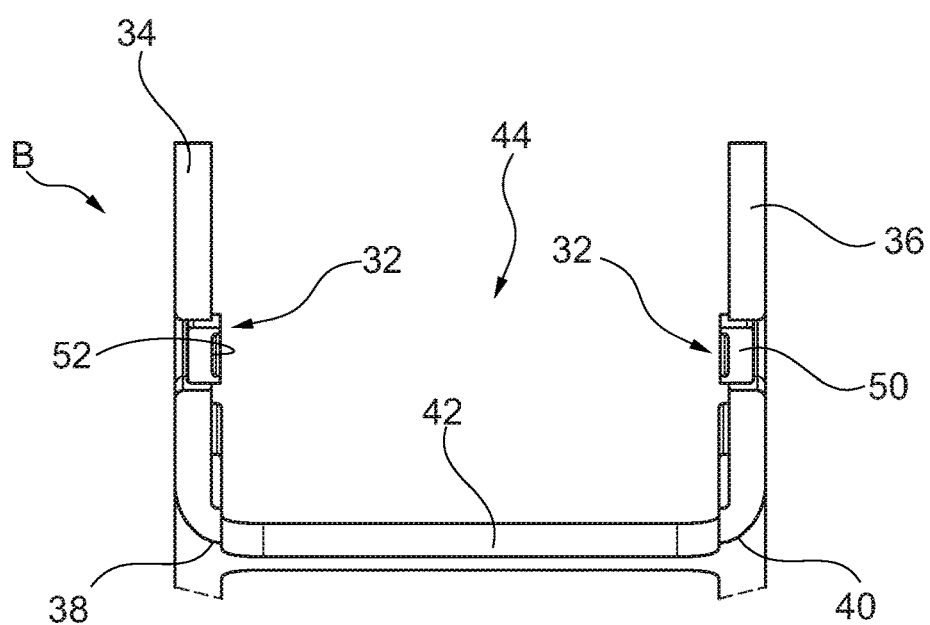
FIG. 4B is a partial view of the cage of FIG. 4A.

The first and second sidewalls 34, 36 of the cage 30 are illustrated as planar and parallel. The tabs are illustrated as substantially coplanar with the sidewalls 34, 36, and FIG. 4B shows the tabs partially inset from the sidewalls. However, it is contemplated that the sidewalls 34, 36 may be only substantially planar and substantially parallel. For example, the sidewalls 34, 36 may each have a slight concavity facing the pockets 44. Regardless of any such minor variations, the tabs 32 are substantially flush with the sidewalls 34, 36, so as to optimize space-saving effects.

Figure 5:
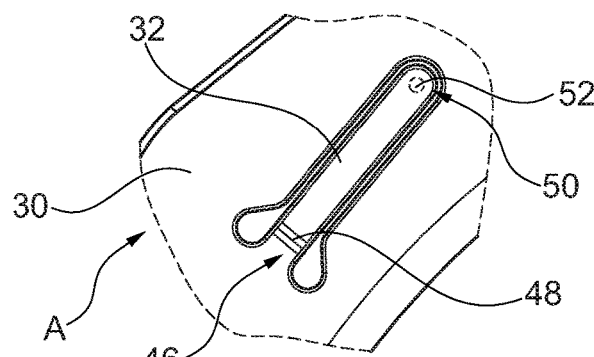
FIG. 5 is a partial view of the cage of FIG. 3A.
Figure 6:
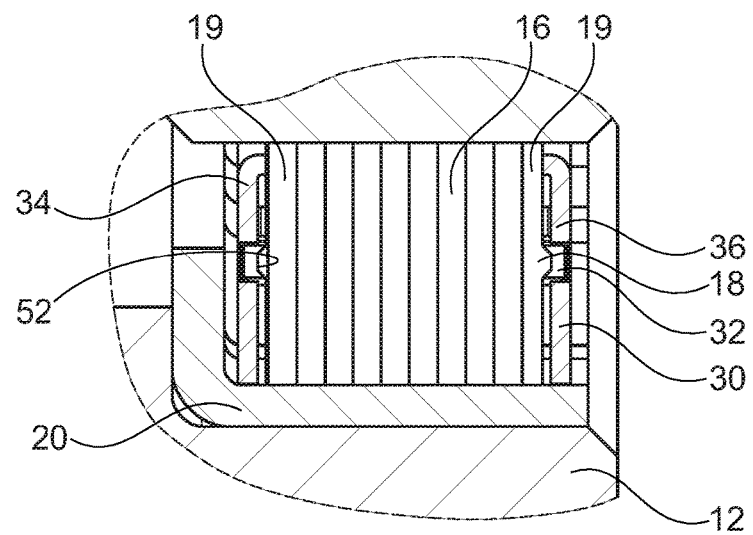
FIG. 6 is a partial cross-sectional view of the one way clutch assembly of FIG. 2B taken along line 6-6.

The tabs 32 are resilient and function as leaf springs engaging the rollers 16 of the one way clutch assembly 10. In the illustrated embodiment with the tabs 32 integrally formed with the sidewalls 34, 36 of the cage 30, the tabs 32 have resiliency via being manufactured as stamped metal. As shown in FIGS. 4B and 5, a proximal portion 46 of the tab 32 has a bend 48 extending inwardly toward the pocket 44 and as such extends obliquely relative to the respective sidewall 34, 36. As a result, a distal portion 50 of the tab 32 is positioned slightly axially inward relative to the sidewalls 34, 36.

As shown in FIGS. 3A, 4B, 5, and 6, each tab 32 includes an indent 52 formed within the distal portion 50. The indent 52 is concave toward the pocket 44. In other words, the indent 52 of one sidewall 34 faces the opposing sidewall 36, and vice versa. The indent 52 is sized and positioned to receive a detent 18 (FIG. 6) of the rolling element 16. As such, the indent 52 is preferably circular, although other shapes including square are contemplated. When assembled, each pocket 44 includes two indents 52, each receiving a detent 18 at a respective axial end 19 of the rolling element 16.

Figure 3B:
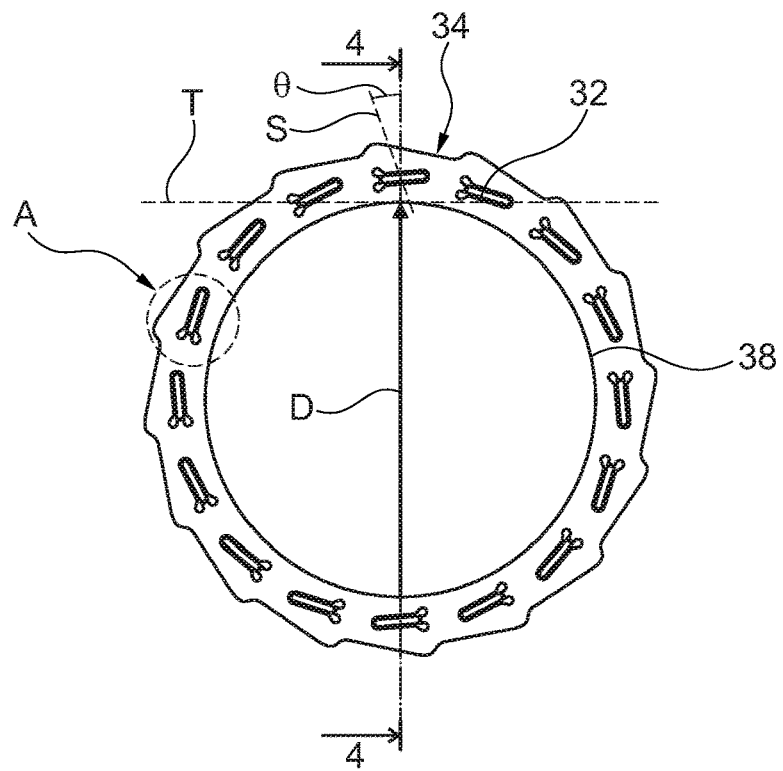
FIG. 3B is a side elevational view of the cage of FIG. 3A.

As best shown in FIG. 3B, the tabs 32 extend generally circumferentially about the sidewalls 34, 36, but as shown in FIG. 3B the tabs are acutely angled relative to a tangent line T. It should be noted that the tabs 32 are preferably longitudinally straight, but are considered to extend "circumferentially" in that they extend along a perimeter of the respective sidewall 34 or 36 and are nearly tangential to the respective inner rim 38 or 40. In other words, each tab 32 is not perpendicular to a radial line passing through the tab, the radial line being defined by a diameter D. Instead, each tab 32 defines a line S perpendicular to the longitude of the tab, such that an angle Θ is defined between lines S and D.

When assembled as in FIGS. 1-2B, the tabs 32 do not obstruct any portion of a circumference of the cage 30 from the rolling elements 16. Instead, the tabs 32 are positioned axially outward from the rolling elements 16 and the tabs coextend with the rolling elements about a circumference of the cage 30. As such, the number of rolling elements 16 may be maximized for a given circumference of the cage 30 based solely on the size of the rolling elements and a clearance between adjacent rolling elements to allow for slight movements within the pockets 44 of the cage 30.

Figure 7A:
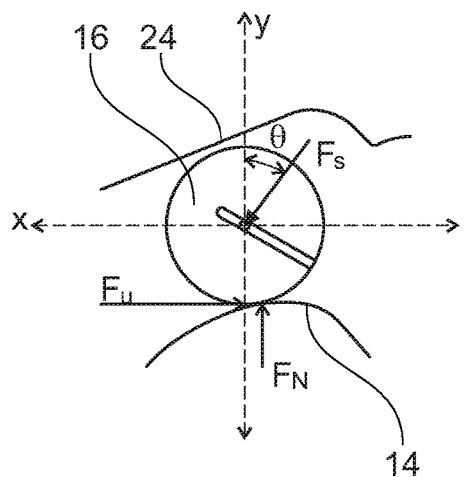
FIG. 7A is a free body diagram of a roller of the one way clutch assembly of FIG. 1.
Figure 7B:
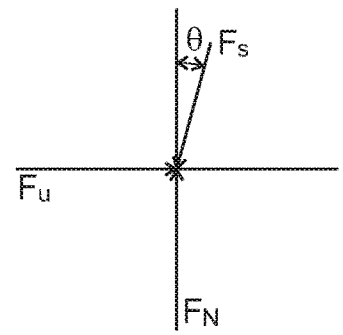
FIG. 7B is a diagram of forces acting in FIG. 7A.

During use and as shown in FIGS. 7A-7B, the angle Θ also reflects a force angle of the tab 32 acting upon the rolling elements 16. In other words, the tab 32 extends at the angle Θ relative to a normal of a tangent of the inner ring 14 at a contact point between the inner ring 14 and the rolling element 16. When the rolling element 16 engages the inner ring 14, a normal force $F_N$ and a friction force $F_\mu$ result. By definition, $F_N$ acts collinearly with diameters of the inner ring 14 and the roller 16 and $F_\mu$ acts perpendicularly to $F_N$. As such, the tab 32 engages the roller 16 at the angle Θ relative to $F_N$.

In designing the one way clutch assembly 10 for a particular application, certain parameters may be determined before the geometry of the assembly, namely a material choice for the inner and outer rings 14, 20 and rolling elements 60. With this information, the coefficient of friction between the rolling elements 16 and the rings 14, 20 can be known. Further, the angle Θ may be calibrated to counteract centrifugal forces that will act upon the rolling elements 16 at a particular RPM or RPM range. In some applications, the one way roller clutch assembly may operate at 1000-2000 RPM.

The spring force angle Θ may be designed as a function of the friction coefficient between the rolling element 16 and the inner ring 14. For a given coefficient of friction μ, the angle Θ may be calculated from the following equation:

$$\Theta = \tan^{-1}(\mu)$$

Figure 8:
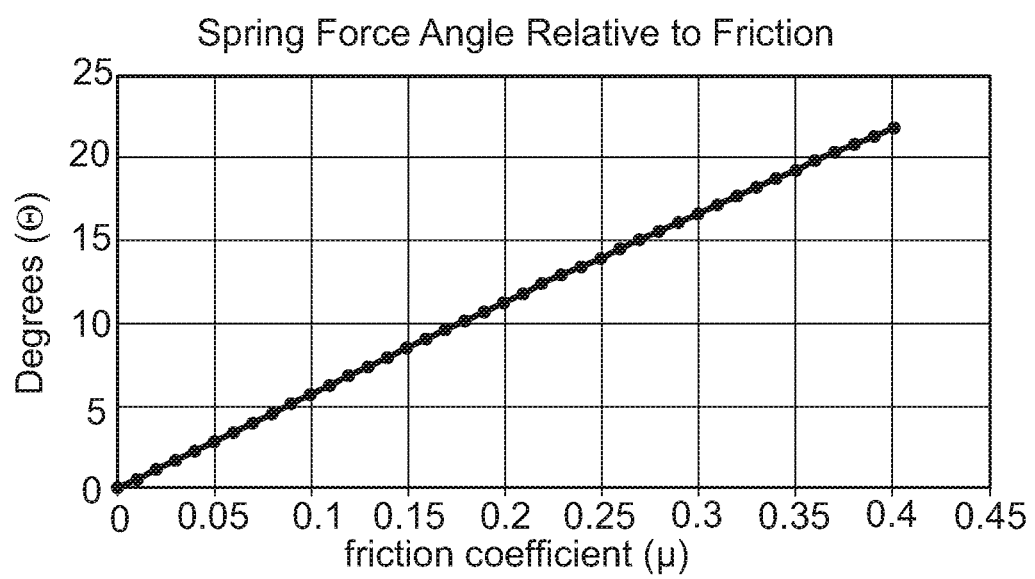
FIG. 8 is a graph of angles for a tab of the cage of FIG. 3A.

FIG. 8 illustrates the results of the above equation for an expected range of the coefficient of friction μ. Overall, the angle Θ may vary from about 0 degrees to about 23 degrees. In a preferred embodiment with steel materials used, the coefficient of friction is about 0.05 to 0.15, more preferably about 0.08 to 0.12. As such the angle Θ is about 4 degrees to about 9 degrees, more preferably about 5 degrees to about 6 degrees.

Having thus described the present invention in detail, it is to be appreciated and will be apparent to those skilled in the art that many physical changes, only a few of which are exemplified in the detailed description of the invention, could be made without altering the inventive concepts and principles embodied therein. One of ordinary skill in the art will recognize from the present disclosure that any number of rolling elements 16 could be used. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. One Way Clutch Assembly
12. Housing
14. Inner Ring
16. Rolling Elements
18. Rotational Axis
20. Outer Ring
22. Opening
24. First ramped portion
26. Ramps
30. Cage
32. Tabs
34. First Sidewall
36. Second Sidewall
38. First Inner Rim
40. Second Inner Rim
42. Webs
44. Pockets
46. Proximal Portion
48. Bend
50. Distal Portion
52. Indent
54. Extending Piston
56. Pivot Joint
Θ Angle of the tab relative to a tangent at a contact point of the rolling element on the inner ring

What is claimed is:

1. A one way clutch assembly comprising:
an inner ring;
an outer ring;
a ramp formed in one of the inner ring or the outer ring facing the other of the inner ring or the outer ring; and
a cage defining at least one rolling element pocket, including:
a substantially planar first sidewall,
a first tab (a) coplanar with the first sidewall or (b) extending substantially parallel to a plane of the first sidewall and extending from the first sidewall, and
rolling elements located in the pockets, the rolling elements are biased by the first tab toward at least one of the inner ring or the outer ring.

2. The one way clutch assembly of claim 1, further comprising a substantially planar second sidewall, wherein each said pocket has a second tab extending in or parallel to a plane of the second sidewall.

3. The one way clutch assembly of claim 2, wherein each said first tab is integrally formed with the first sidewall, and each said second tab is integrally formed with the second sidewall.

4. The one way clutch assembly of claim 2, wherein each said first tab includes a first indent that receives a detent on a first axial end of the respective rolling element, and each said second tab includes a second indent that receives a detent on a second axial end of the respective rolling element.

5. The one way clutch assembly of claim 1, wherein the first tab extends at an angle Θ relative to a tangent at a contact point of the rolling element on the inner ring.

6. The one way clutch assembly of claim 5, wherein Θ is between about 4 degrees and about 9 degrees.

7. The one way clutch assembly of claim 5, wherein Θ is about 5 degrees.

8. The one way clutch assembly of claim 2, wherein the first tab and the second tab each extend at an angle Θ relative to a tangent at a contact point of the rolling element on the inner ring, and
wherein due to the angle Θ, at a rotational speed at or above a predetermined RPM causing centrifugal forces on the rolling element, the first and second tabs are adapted to minimize contact between the rolling element and the inner ring and the first and second tabs are adapted to minimize contact between the rolling element and the outer ring.

9. The one way clutch assembly of claim 1, wherein each said first tab includes a bend in a proximal portion of the first tab, the bend extending from the respective sidewall of the cage in an axial direction of the clutch assembly.

10. A circular cage for a one way clutch, the cage comprising:
a plurality of pockets each adapted to receive a rolling element, the plurality of pockets each including:
a first resilient tab integrally formed with the cage and extending generally circumferentially along a portion of the cage, the first resilient tab adapted to bias a rolling element in a respective pocket in a radial direction of the cage,
wherein the first resilient tab includes an indent formed concavely toward a center of the cage, the indent being adapted to receive a detent of a rolling element.

11. The circular cage of claim 10, further comprising a second resilient tab integrally formed with the cage axially opposite to the first resilient tab.

12. A circular cage for a one way clutch, the cage comprising:
opposing first and second sidewalls each having a circular inner rim;
a plurality of webs extending between the first and second sidewalls to define a plurality of pockets adapted to receive roller bearings; and
a plurality of resilient tabs integrally formed with the first and second sidewalls and adapted to engage a roller bearing,
wherein each said tab has a bend at a proximal portion and wherein each said tab is substantially coplanar to or substantially parallel with the respective sidewall.

13. The circular cage of claim 12, the proximal portion of each said tab extending obliquely from the respective sidewall in an axial direction of the circular cage.

14. The circular cage of claim 12, wherein each said tab has a distal portion including an indent facing the opposing sidewall.

15. The circular cage of claim 14, wherein each said tab extends at an angle Θ relative to a radial line aligned with the respective indent of the tab.

16. The circular cage of claim 15, wherein Θ is between about 2 degrees and about 23 degrees.

* * * * *